United States Patent
Miranowski

(10) Patent No.: US 6,618,978 B1
(45) Date of Patent: Sep. 16, 2003

(54) ICE FISHING SLUSH REMOVER

(76) Inventor: Allan Miranowski, 2666 190th St., Kent, MN (US) 56553

( * ) Notice: Subject to any disclaimer, the term of this patent is extended or adjusted under 35 U.S.C. 154(b) by 0 days.

(21) Appl. No.: 10/264,064

(22) Filed: Oct. 2, 2002

(51) Int. Cl.⁷ .............................................. A01K 97/01
(52) U.S. Cl. ............................................................ 43/4
(58) Field of Search ................... 43/1, 4, 4.5; 210/470, 210/464, 465; 294/53.5

(56) References Cited

U.S. PATENT DOCUMENTS

| | | | |
|---|---|---|---|
| 1,003,410 A | * 9/1911 | Arnesen ...................... 210/415 |
| 2,021,874 A | * 11/1935 | Taylor ........................... 294/29 |
| 2,799,146 A | * 7/1957 | Meagher .................... 249/66.1 |
| 2,813,631 A | * 11/1957 | Odman ........................ 210/359 |
| 2,838,196 A | * 6/1958 | Chapman .................... 220/327 |
| 3,059,451 A | * 10/1962 | Anderson ................... 249/66.1 |
| 3,289,850 A | 12/1966 | Gubash ....................... 210/470 |
| 3,722,940 A | * 3/1973 | Misjak ......................... 294/1.1 |
| 3,747,253 A | 7/1973 | Gangi et al. ..................... 43/4 |
| 3,857,787 A | 12/1974 | Kinne .......................... 210/470 |
| 4,718,188 A | 1/1988 | Roberts ............................ 43/4 |
| 4,769,939 A | 9/1988 | Gonska et al. .................... 43/4 |
| 4,866,872 A | * 9/1989 | Guilbault et al. ................. 43/4 |
| 4,978,156 A | 12/1990 | Marhula ...................... 294/1.1 |
| 5,024,757 A | 6/1991 | Malak ......................... 210/136 |
| 5,072,538 A | 12/1991 | Hendricks et al. ............... 43/4 |
| 5,140,767 A | 8/1992 | Traut ............................... 43/4 |
| 5,784,824 A | * 7/1998 | Myroniuk ........................ 43/4 |
| 6,412,213 B1 | * 7/2002 | Wellard ......................... 43/12 |

* cited by examiner

Primary Examiner—Peter M. Poon
Assistant Examiner—David Parsley

(57) ABSTRACT

An ice fishing slush remover for the quick, efficient and orderly capture, removal and discharge of slush from an ice fishing hole. The ice fishing slush remover includes a cylinder with a pair of semi-circular plates pivotally attached to the lower end of the cylinder. A frame is attached to the upper end of the cylinder. A pair of rods run the length of the cylinder and are attached to the pair of semi-circular plates. The pair of rods are threaded through a pair of openings in the frame. The ends of the pair of rods opposite the semi-circular plates are connected to the handle. When the handle is pushed toward the cylinder the semi-circular plates move downward opening the system. When the handle is drawn upwards the semi-circular plates move upward forming a circle and closing the system. Discharge and capture occurs at the same end of the system.

9 Claims, 6 Drawing Sheets

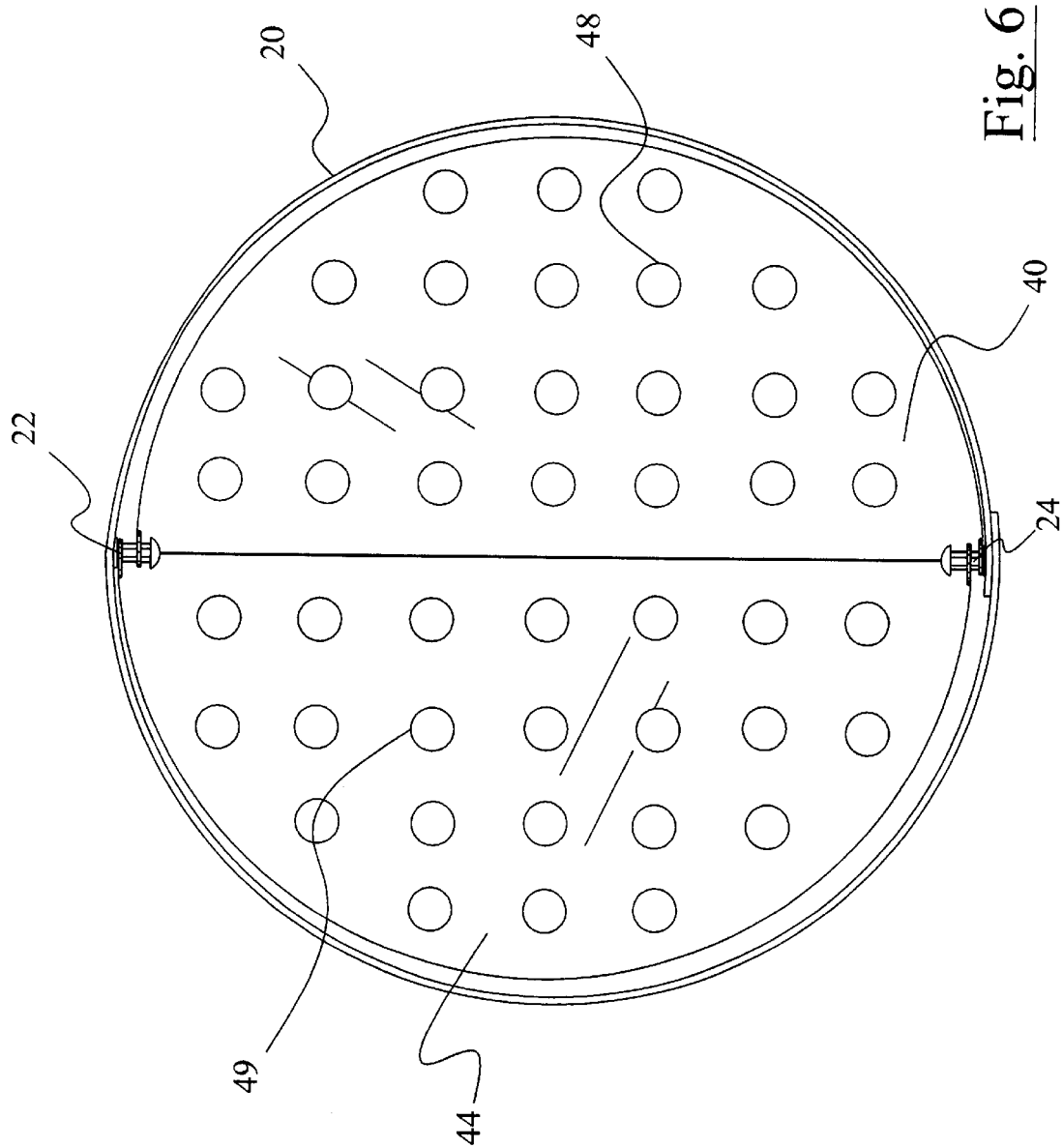

ICE FISHING SLUSH REMOVER

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to devices for clearing ice chips from ice fishing holes and more specifically it relates to an ice fishing slush remover for the quick, efficient and orderly capture, removal and discharge of ice and snow debris from an ice fishing hole.

2. Description of the Related Art

Devices for clearing ice chips from ice fishing holes have been in use for years. Typically, an individual ice fishing uses some type of ice auger to drill a hole in the ice. Obviously, as the hole is drilled the resulting ice chips and snow, if any is present, collects in the space left by the auger. In addition, over time the ice fishing hole will began to freeze over creating new ice chips and slush. Often an ice skimmer is used to ladle out the ice and snow from the ice fishing hole. Ice skimmers are normally nothing more than a concave-shaped strainer on the end of a long pole.

Using an ice skimmer can be a time-consuming and laborious process. The ice skimmer is placed into the hole repeatedly and the ice chips and snow that are removed are drawn out and poured onto the surrounding surface. The process often results in water and ice chips being spilled on the user and can make the area surrounding the hole wet with piles of ice chips and slush. The problem of discarding ice chips and slush while using an ice skimmer becomes even more acute when the user is working in an ice house or other protective structure. Normally an individual attempts to keep the area inside an ice house or protective structure relatively dry.

Examples of patented devices which may be related to the present invention include U.S. Pat. No. 5,024,757 to Malak; U.S. Pat. No. 4,718,188 to Roberts; U.S. Pat. No. 3,857,787 to Kinne; U.S. Pat. No. 3,289,850 to Gubash; U.S. Pat. No. 5,072,538 to Hendricks et al.; U.S. Pat. No. 5,140,767 to Traut; U.S. Pat. No. 4,978,156 to Marhula; U.S. Pat. No. 4,769,939 to Gonska et al.; and U.S. Pat. No. 3,747,253 to Gangi et al.

While these devices may be suitable for the particular purpose to which they address, they are not as suitable for the quick, efficient and orderly capture, removal and discharge of ice and snow debris from an ice fishing hole. Prior art systems consistently use variations of the skimmer on the end of a pole. These systems are limited by the volume of material that the skimmer can hold. This limiting factor therefore requires repeatedly dipping the skimmer into the fishing hole. In addition, prior art systems do not resolve the problem of maintaining the area surrounding the fishing hole relatively dry and free of snow and ice debris. Those systems which attempt to remove a greater volume of ice chips are limited in their methods of discharging the collected snow and debris.

In these respects, the ice fishing slush remover according to the present invention substantially departs from the conventional concepts and designs of the prior art, and in so doing provides an apparatus primarily developed for the purpose of quick, efficient and orderly capture, removal and discharge of ice and snow debris from an ice fishing hole.

BRIEF SUMMARY OF THE INVENTION

In view of the foregoing disadvantages inherent in the known types of devices for clearing ice chips from ice fishing holes now present in the prior art, the present invention provides a new ice fishing slush remover construction wherein the same can be utilized for quick, efficient and orderly capture, removal and discharge of ice and snow debris from an ice fishing hole.

The general purpose of the present invention, which will be described subsequently in greater detail, is to provide a new ice fishing slush remover that has many of the advantages of the devices for clearing ice chips from ice fishing-.holes mentioned heretofore and many novel features that result in a new ice fishing slush remover which is not anticipated, rendered obvious, suggested, or even implied by any of the prior art devices for clearing ice chips from ice fishing holes, either alone or in any combination thereof.

To attain this, the present invention generally comprises a hollow cylinder with a pair of semi-circular perforated plates pivotally attached to the lower portion of the cylinder. A pair of rods run through the cylinder and are attached to the pair of semi-circular plates. The ends of the rods opposite the semi-circular plates are connected to the handle. A frame attached to the upper portion of the cylinder keeps the rods in proper alignment with the semicircular plates and the handle. This design allows for the user to open and close the plates manually, and to be able to capture and discharge slush from one end of the cylinder.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an ice fishing slush remover that will overcome the shortcomings of the prior art devices.

A second object is to provide an ice fishing slush remover for the quick, efficient and orderly capture, removal and discharge of ice and snow debris from an ice fishing hole.

Another object is to provide an ice fishing slush remover that is easy to use.

An additional object is to provide an ice fishing slush remover that allows for the ice and snow debris to be transported away from the fishing location.

A further object is to provide an ice fishing slush remover that removes the ice and snow debris in one step.

Another object is to provide an ice fishing slush remover that has an ergonomic design.

A further object is to provide an ice fishing slush remover that permits the ice and snow debris to be captured and discharged from the same end.

An additional object is to provide an ice fishing slush remover that water can drain from to minimize the weight when transporting the ice and snow debris.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 6 is a bottom end view of the present invention with the plates in the closed position.

DETAILED DESCRIPTION OF THE INVENTION

Figure 1:
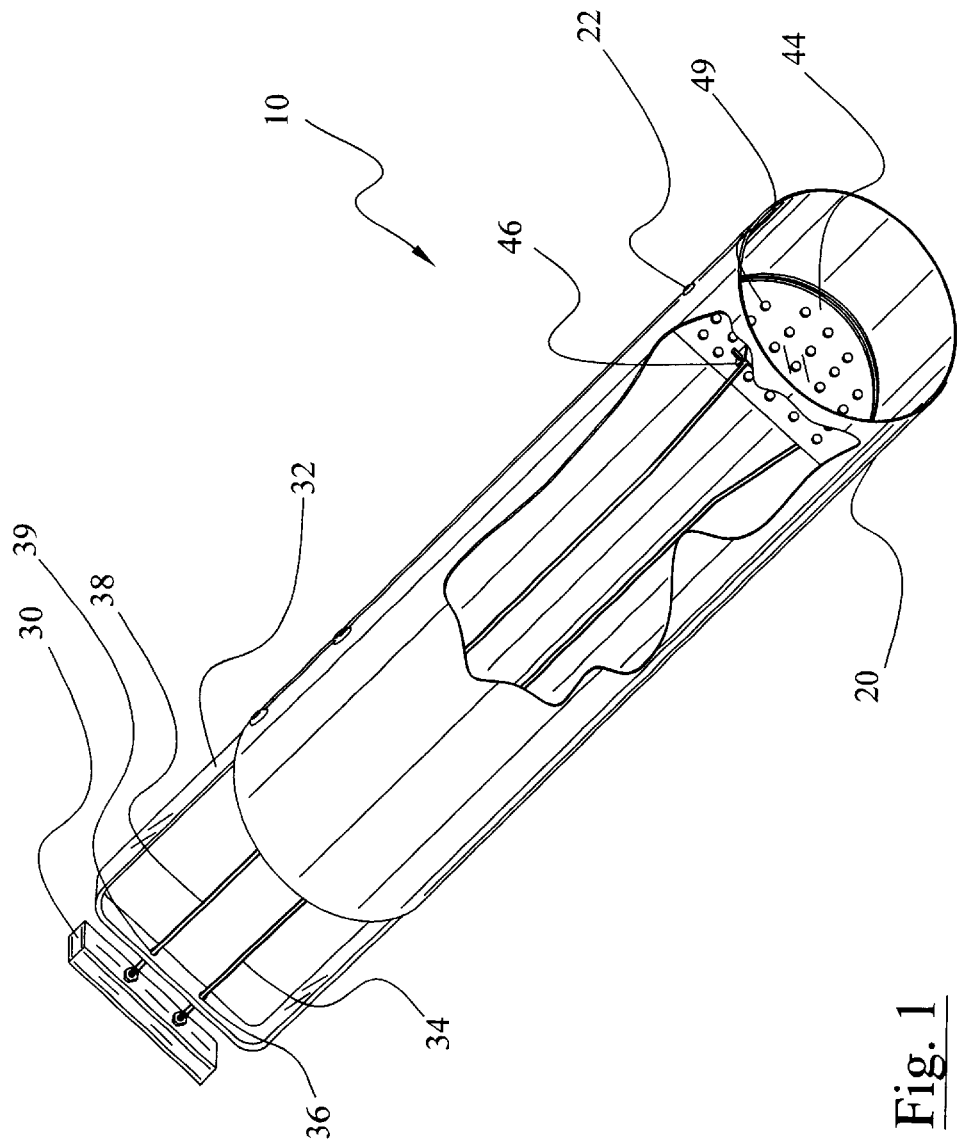
FIG. 1 is an upper perspective view of the present invention partly cut away to show details of the interior construction.

Turning now descriptively to the drawings, in which similar reference characters denote similar elements throughout the several views, FIGS. 1 through 6 illustrate an ice fishing slush remover 10, which comprises a cylinder 20 having a first plate 40 and a second plate 44 pivotally attached to the lower portion of the cylinder 20. A first rod 34 and a second rod 38 mechanically connect the first plate 40 and the second plate 44 to the handle 30. A frame 32 maintains the first rod 34 and the second rod 38 in the proper alignment with the cylinder 20 and the first plate 40 and the second plate 44.

The cylinder 20 is a hollow tube having an upper portion and a lower portion. The cylinder 20 is preferably made of metal. However it can be appreciated by one skilled in the art that other material could be used for the cylinder 20. The diameter of the cylinder 20 is preferably slightly smaller than the hole created by an ice auger or other ice fishing hole making device. A variety of different size diameter cylinders 20 could be designed for the ice fishing slush remover 10 corresponding to the standard sizes of ice augers. The length of the cylinder 20 should preferably be longer than the depth of the ice where the fishing hole is located. Clearly, the cylinder 20 of the ice fishing slush remover 10 could be of a variety of different lengths.

Figure 2:
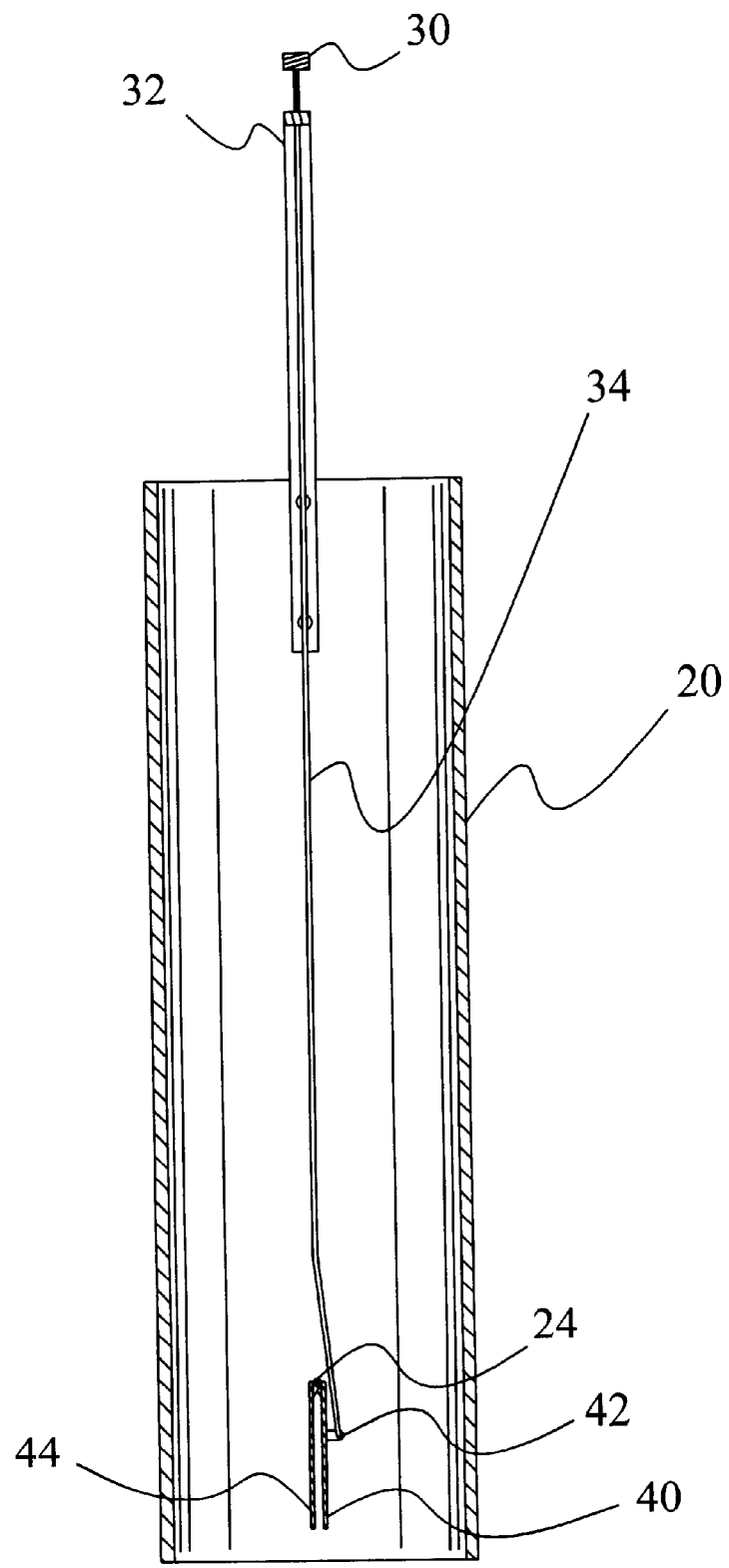
FIG. 2 is a side cutaway view of the present invention illustrating the plates in the down position.
Figure 3:
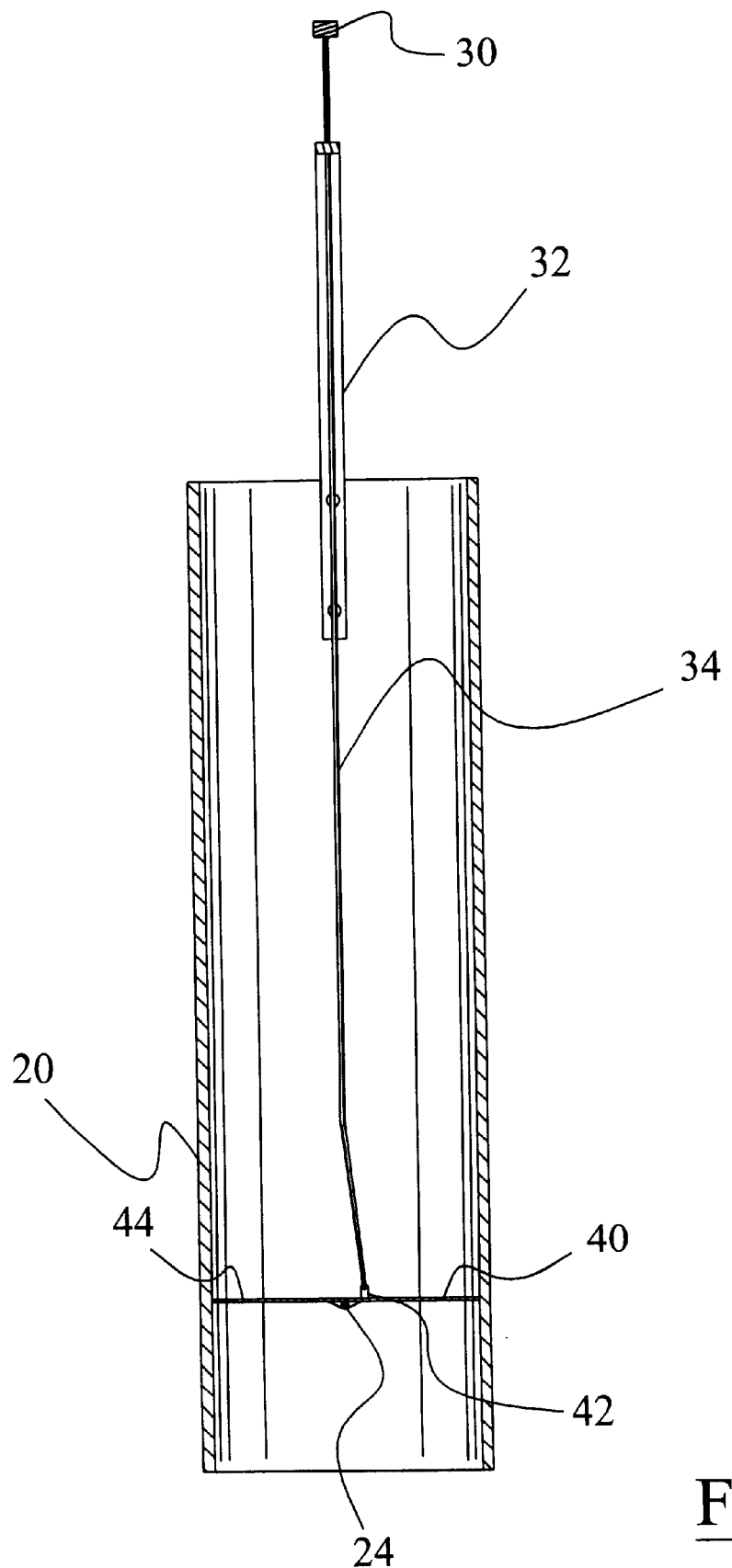
FIG. 3 is side cutaway view of the present invention illustrating the plates in the closed position.
Figure 4:
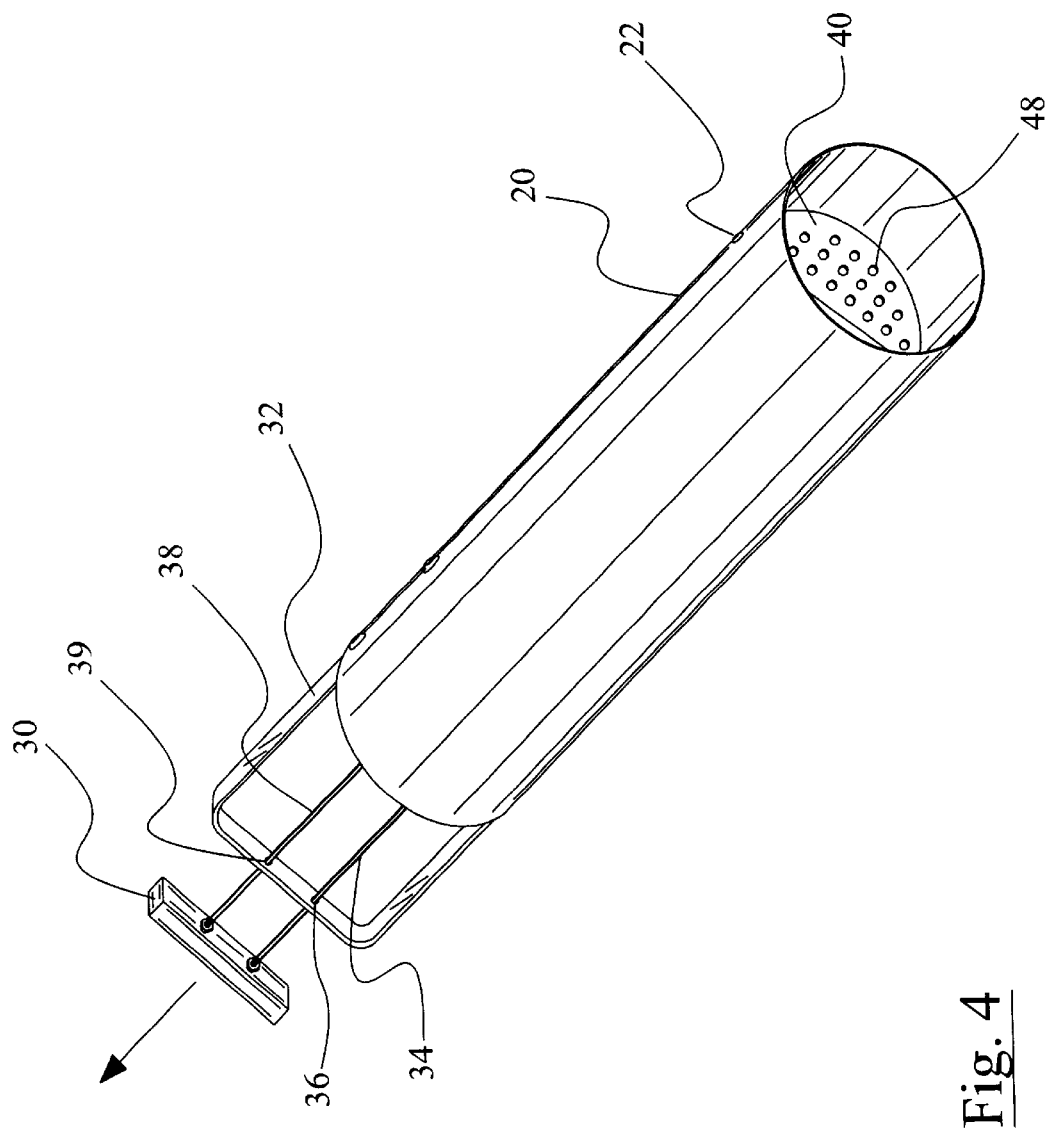
FIG. 4 is an upper perspective view of the present invention in the closed position.
Figure 5:
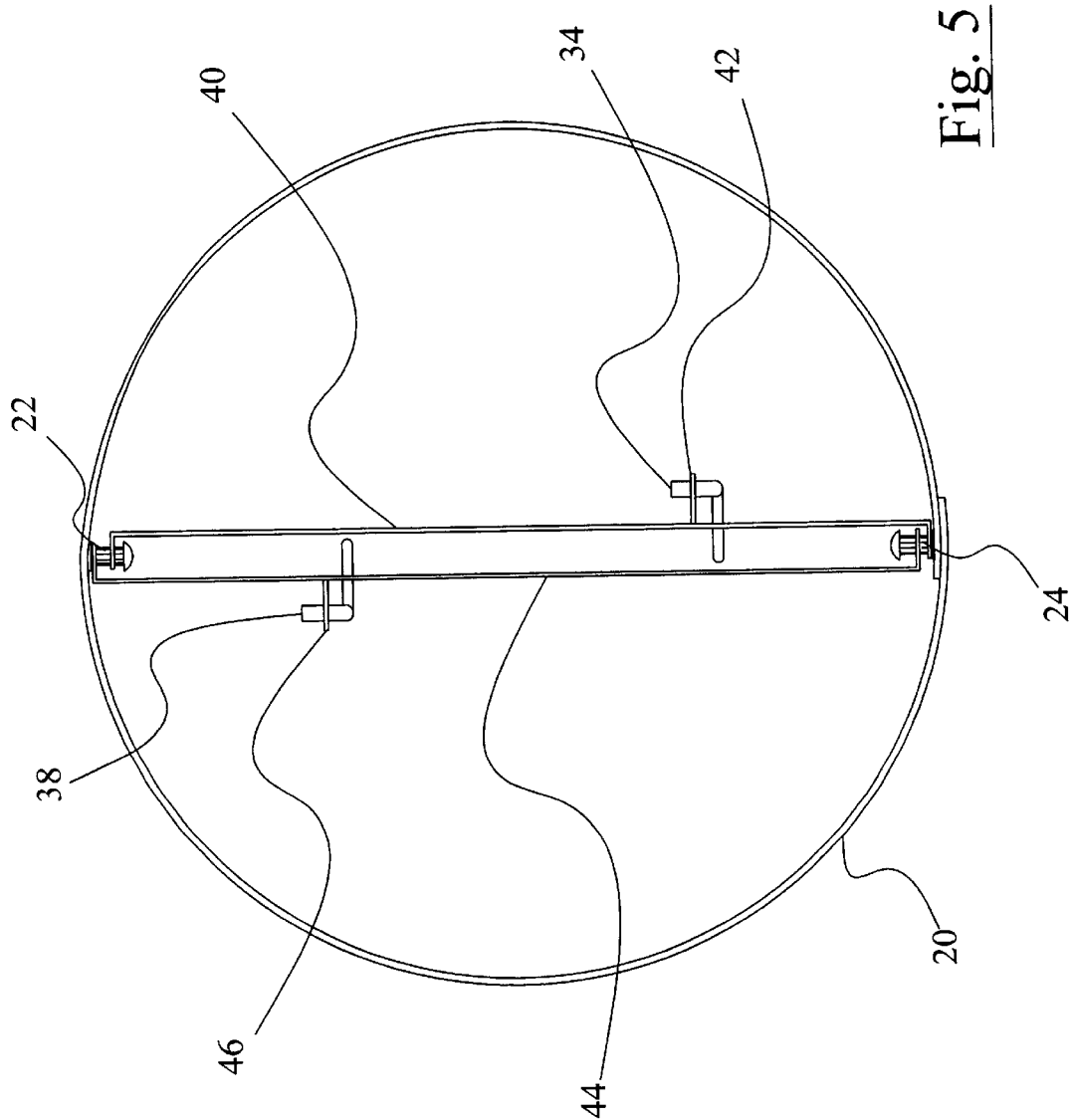
FIG. 5 is a bottom end view of the present invention with plates in the opened position.

As best seen in FIGS. 1, 2 and 3, a first plate 40 and a second plate 44 are pivotally attached to the lower portion of the cylinder 20. The first plate 40 and the second plate 44 are preferably made of metal. However, it can be appreciated by one skilled in the art that other material could be used for the first plate 40 and the second plate 44. The first plate 40 and the second plate 44 are preferably semi-circular in shape and of an identical size. The diameter of the circle created by placing the first plates 40 side-by-side and in a coplanar alignment with the second plate 44 is preferably slightly smaller than the diameter of the cylinder 20. The first plate 40 has a plurality of first apertures 48 to assist in draining the water from the cylinder 20 when the ice fishing slush remover 10 is in use. The second plate 44 has a plurality of second apertures 49 to additionally assist in draining water from the cylinder 20. However, it can be appreciate by one skilled in the art that the first plate 40 and the second plate 44 could be designed with no apertures. The diametral ends of the first plate 40 are attached to the cylinder 20 using a first pivot point 22 and a second pivot point 24. The diametral ends of the second plate 44 are additionally attached to the cylinder 20 at the first pivot point 22 and the second pivot point 24.

The first pivot point 22 and the second pivot point 24 are preferably affixed to the cylinder 20 at a position directly opposite one another. Additionally, the first pivot point 22 is preferably affixed to the cylinder 20 at a distance from the bottom end of the cylinder 20 slightly greater than the width of the first plate 40. Correspondingly, the second pivot point 24 is preferably affixed to the cylinder 20 at a distance from the bottom end of the cylinder slightly greater than the width of the second plate 44. By placing the first pivot point 22 and second pivot point 24 at these locations the first plate 40 and the second plate 44 cannot extend past the bottom end of the ice fishing slush remover 10. Therefore, the ice fishing slush remover 10 can stand upright in the open position for easier storage when not in use. When the ice fishing slush remover 10 is placed in the closed position the first plate 40 and the second plate 44 are generally in a coplanar alignment perpendicular to the axis of the cylinder 20. A first rod 34 and a second rod 38 are used to move the first plate 40 and the second plate 44 respectively from the open to closed position and vice versa.

The first plate 40 is attached to the first rod 34 at the first attachment point 42. The second plate 44 is attached to the second rod 38 at the second attachment point 46. In the preferred embodiment both the first rod 34 and the second rod 38 are made of metal however, it can be appreciated by one skilled in the art that other materials could be used. As seen in FIGS. 1,2, and 3, the first rod 34 and the second rod 38 are preferably of a length to travel from the first plate 40 and second plate 44 respectively to a point above the frame 32. The first rod 34 and the second rod 38 are attached to the handle 30. Therefore, the first rod 34 and the second rod 38 transfer the movement of the handle 30 relative to the first plate 40 and the second plate 44. The first rod 34 may include a first stop, and the second rod 38 may include a second stop, to restrict the travel of the first rod 34 and the second rod 38.

As best seen in FIGS. 1, 2 and 3, a frame 32 is attached to the upper portion of the cylinder 20. The frame 32 is preferably made of metal. However, it can be appreciated by one skilled in the art that the frame 32 could be made of different material and in different shapes. The length of the ends of the frame 32 attached to the cylinder limits the distance the handle 30 can travel relative to the cylinder 20. It can be appreciated by one skilled in the art that the frame 32 can be in a variety of shapes and sizes. The frame 32 includes a first opening 36 and a second opening 39. The first rod 34 runs through the first opening 36 and the second rod 38 runs through the second opening 39. Correspondingly, the diameter of the first openings 36 and the second opening 39 are slightly larger than the diameter of the first rod 34 and the second rod 38.

The first stop is preferably of a diameter larger than the first opening 36, and the second stop is preferably of a diameter larger than the second opening 39. The first stop 38 is located on the first rod 34 at a point between the handle 30 and the frame 32. The second stop is located on the second rod 38 at a point between the handle 30 and the frame 32 preferably at the same distance from the handle 30 as the first stop 38. The first stop and the second stop are preferably at a point to allow the free movement of the first rod 34 and the second rod 38 while still protecting the hands of the individual using the ice fishing slush remover 10 by keeping the handle 30 a safe distance from the frame 32.

The handle 30 is attached to the first rod 34 and the second rod 38. In the preferred embodiment the handle 30 is made of wood for comfort and to minimize the transfer of cold to the user. However, it can be appreciated by one skilled in the art that other materials could be used for the handle 30.

In use, the ice fishing slush remover 10 is placed over a fishing hole. The ice fishing slush remover 10 is then inserted into the fishing hole. As the handle 30 is in the down position the first plate 40 and the second plate 44 are in the down position substantially making the interior of the cylinder 20 open. As the cylinder 20 at this point is largely a hollow tube the ice fishing slush remover 10 can be forced past the ice and snow debris floating in the hole. The bottom end of cylinder 20 is preferably pushed to a depth below that of the ice layer of the fishing hole.

The user now pulls the handle 30 up. As the handle 30 is pulled up the first rod 34 and the second rod 38 transfer that handle 30 motion and pull up the first plate 40 and the second plate 44 respectively. The first plate 40 rotates on the first pivot point 22 and the second pivot point 24. Correspondingly the second plate 44 rotates on the first pivot point 22 and the second pivot point 24. As the first plate 40 and the second plate 44 are pulled into a generally coplanar position, the semi-circular shape of the first plate 40 and the second plate 44 form a circle. Once the first plate 40 and the second plate 44 are in a coplanar alignment the interior of the cylinder 20 is substantially closed trapping the ice and snow debris along with the surrounding water within the cylinder 20. As the user continues to pull the handle 30 away from the fishing hole the ice fishing slush remover 10 begins to exit the fishing hole and the water begins to drain from the bottom of the ice fishing slush remover 10. The user then pulls the cylinder 20 completely out of the fishing hole allowing the remaining water to drain out into the hole. The ice fishing slush remover 10 can then be transported to wherever the user wants to deposit the contents. To deposit the contents the user simply pushes the handle 30 down toward the frame 32 and cylinder 20. The first rods 34 and the second rod 38 transfer that movement to the first plate 40 and the second plate 44. As the first plate 40 and the second plate 44 are pushed down the first plate 40 and the second plate 44 rotate downward causing the ice fishing slush remover 10 to be in the open configuration and allowing the ice and snow debris to fall out.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ice fishing slush remover, comprising:

a cylinder having a lower portion, an upper portion and a lower opening;

a first plate pivotally attached within said lower portion of said cylinder;

a second plate pivotally attached within said lower portion of said cylinder, wherein the diametral edge of said second plate is closely adjacent to the diametral edge of said first plate;

a first rod connected to said first plate;

a second rod connected to said second plate;

a frame having a first opening and a second opening, wherein said frame is connected to said upper portion of said cylinder and wherein said frame has an inverted U-shaped structure; and a handle member connected to said first rod and said second rod;

wherein said first rod travels from said first plate through said first opening to said handle member, and wherein said second rod travels from said second plate through said second opening to said handle member.

2. The ice fishing slush remover of claim 1, wherein said first rod has a first stop located between said first opening and said handle member, and wherein said second rod has a second stop located between said second opening and said handle member.

3. The ice fishing slush remover of claim 1, wherein said first plate and said second plate are similarly sized, semi-circular in shape and include a plurality of apertures.

4. The ice fishing slush remover of claim 1, wherein the diameter of said first plate and said second plate when in a coplanar position is smaller than the diameter of said cylinder.

5. The ice fishing slush remover of claim 1, wherein said first plate and said second plate are pivotally attached within said lower portion of said cylinder at a distance from a bottom end of said cylinder slightly greater than the width of said first plate.

6. The ice fishing slush remover of claim 1, wherein said handle member is made of wood.

7. The ice fishing slush remover of claim 1, wherein said cylinder is of a diameter slightly smaller than a standard ice fishing hole.

8. The ice fishing slush remover of claim 1, wherein said cylinder is of a length slightly longer than the depth of a standard ice fishing hole.

9. An ice fishing slush remover, comprising:

a cylinder having a lower portion, an upper portion and a lower opening;

a first plate pivotally attached within said lower portion of said cylinder;

a second plate pivotally attached within said lower portion of said cylinder, wherein the diametral edge of said second plate is closely adjacent to the diametral edge of said first plate;

a first rod connected to said first plate;

a second rod connected to said second plate;

a frame having a first opening and a second opening, wherein said frame is connected to said upper portion of said cylinder and wherein said frame has an inverted U-shaped structure; and a handle member connected to said first rod and said second rod;

wherein said first rod travels from said first plate through said first opening to said handle member, and wherein said second rod travels from said second plate through said second opening to said handle member;

wherein said first rod has a first stop located between said first opening and said handle member, and wherein said second rod has a second stop located between said second opening and said handle member;

wherein said first plate and said second plate are similarly sized, semi-circular in shape and include a plurality of apertures;

wherein the diameter of said first plate and said second plate when in a coplanar position is smaller than the diameter of said cylinder;

wherein said first plate and said second plate are pivotally attached within said lower portion of said cylinder at a distance from a bottom end of said cylinder slightly greater than the width of said first plate.

* * * * *